US009609982B2

(12) United States Patent
Padgett et al.

(10) Patent No.: US 9,609,982 B2
(45) Date of Patent: Apr. 4, 2017

(54) OVEN BROIL BURNER

(71) Applicant: Electrolux Home Products, Inc., Charlotte, NC (US)

(72) Inventors: Michael Padgett, Springfield, TN (US); Mohsen Sarfehjoo, Franklin, TN (US); George Lewis, Springfield, TN (US); Brian Martin, Gallatin, TN (US)

(73) Assignee: ELECTROLUX HOME PRODUCTS, INC., Charlotte, NC (US)

( * ) Notice: Subject to any disclaimer, the term of this patent is extended or adjusted under 35 U.S.C. 154(b) by 215 days.

(21) Appl. No.: 14/226,263

(22) Filed: Mar. 26, 2014

(65) Prior Publication Data
US 2014/0290642 A1    Oct. 2, 2014

Related U.S. Application Data

(60) Provisional application No. 61/805,267, filed on Mar. 26, 2013.

(51) Int. Cl.
*A47J 37/06* (2006.01)
*F24C 3/08* (2006.01)

(52) U.S. Cl.
CPC .......... *A47J 37/0682* (2013.01); *F24C 3/087* (2013.01)

(58) Field of Classification Search
CPC ....................................................... F24C 3/087
USPC ........................................ 126/21 R; 431/354
See application file for complete search history.

(56) References Cited

U.S. PATENT DOCUMENTS

| 2,235,886 | A | | 3/1941 | Kahn | |
|---|---|---|---|---|---|
| 2,883,978 | A | * | 4/1959 | Nelson | F24C 3/027 |
| | | | | | 126/21 R |
| 3,322,112 | A | * | 5/1967 | Huff | A47J 37/06 |
| | | | | | 126/41 R |
| 3,530,847 | A | * | 9/1970 | Saponara | F24C 14/025 |
| | | | | | 126/21 R |
| 4,020,323 | A | | 4/1977 | Dills | |
| 4,416,249 | A | * | 11/1983 | Reynolds | A47J 37/06 |
| | | | | | 126/41 R |
| 5,078,121 | A | | 1/1992 | Ha | |
| 5,406,703 | A | * | 4/1995 | Haen | F23D 14/105 |
| | | | | | 29/469.5 |

(Continued)

FOREIGN PATENT DOCUMENTS

| DE | 967901 C | 1/1958 |
|---|---|---|
| FR | 754561 A | 11/1933 |
| WO | 2010013930 A2 | 2/2010 |

OTHER PUBLICATIONS

International Search Report and Written Opinion issued in Application No. PCT/US2014/031872 dated Jun. 26, 2014.

*Primary Examiner* — Avinash Savani
(74) *Attorney, Agent, or Firm* — Pearne & Gordon LLP

(57) ABSTRACT

Provided is a broil burner including a generally-tubular gas conduit configured to extend between a rearward region of an oven cavity and a forward region of the oven cavity. The gas conduit includes an inlet that cooperates with a gas source to convey a combustible gas from the gas source to the gas conduit, and a plurality of apertures through which the combustible gas exits the gas conduit to be combusted. A reflector is provided, and extends between opposing segments of the gas conduit to reflect heat generated by combustion of the combustible gas in a downward direction, generally toward a central region of the oven cavity.

21 Claims, 3 Drawing Sheets

(56) References Cited

U.S. PATENT DOCUMENTS

| | | |
|---|---|---|
| 7,267,544 B2 | 9/2007 | Spangrud |
| 8,272,320 B2 | 9/2012 | Baker et al. |
| 2005/0138789 A1* | 6/2005 | Offredi ............... F23D 14/105 29/505 |
| 2008/0210217 A1* | 9/2008 | Offredi ............... F23D 14/10 126/39 E |
| 2010/0307474 A1 | 12/2010 | Padgett |
| 2012/0266862 A1 | 10/2012 | Ryu et al. |

* cited by examiner

OVEN BROIL BURNER

CROSS-REFERENCE TO RELATED APPLICATIONS

This application claims the benefit of U.S. Provisional Application No. 61/805,267, filed Mar. 26, 2013, which is incorporated in its entirety herein by reference.

BACKGROUND OF THE INVENTION

1. Field of the Invention

This application relates generally to a cooking appliance with a broil heating element and, more specifically, to broil heating element that can be used to retrofit an existing oven and a cooking appliance including such a heating element.

2. Description of Related Art

Conventional broil burners have traditionally included a gas conduit in which was formed a plurality of holes through which a gas exited the burner. Combustion of this gas generated heat for cooking food within an oven cavity, but the heat generated by such conventional burners rises through natural convection. The initial rise of the heat extended the time needed to elevate the temperature within a central region of the oven cavity located vertically beneath the broil burner, thereby limiting the efficiency of the oven.

BRIEF SUMMARY OF THE INVENTION

According to one aspect, the subject application involves a broil burner including a generally-tubular gas conduit configured to extend between a rearward region of an oven cavity and a forward region of the oven cavity. The gas conduit includes an inlet that cooperates with a gas source to convey a combustible gas from the gas source to the gas conduit, and a plurality of apertures through which the combustible gas exits the gas conduit to be combusted. A reflector is provided, and extends between opposing segments of the gas conduit to reflect heat generated by combustion of the combustible gas in a downward direction, generally toward a central region of the oven cavity.

According to another aspect, the subject application involves a cooking apparatus including an oven cavity in which a food item is to be received and cooked, and a bake burner arranged adjacent to a floor of the oven cavity to generate heat for elevating a temperature within the oven cavity. A broil burner is arranged adjacent to a ceiling of the oven cavity and operable independently of the bake burner to generate heat for elevating the temperature in the oven cavity. The broil burner includes a generally-tubular gas conduit configured to extend between a rearward region of the oven cavity and a forward region of the oven cavity. The gas conduit includes an inlet that cooperates with a gas source to convey a combustible gas from the gas source to the gas conduit, and a plurality of apertures through which the combustible gas exits the gas conduit to be combusted. A reflector provided to the broil burner extends between opposing segments of the gas conduit to reflect heat generated by combustion of the combustible gas in a downward direction, generally toward a central region of the oven cavity.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
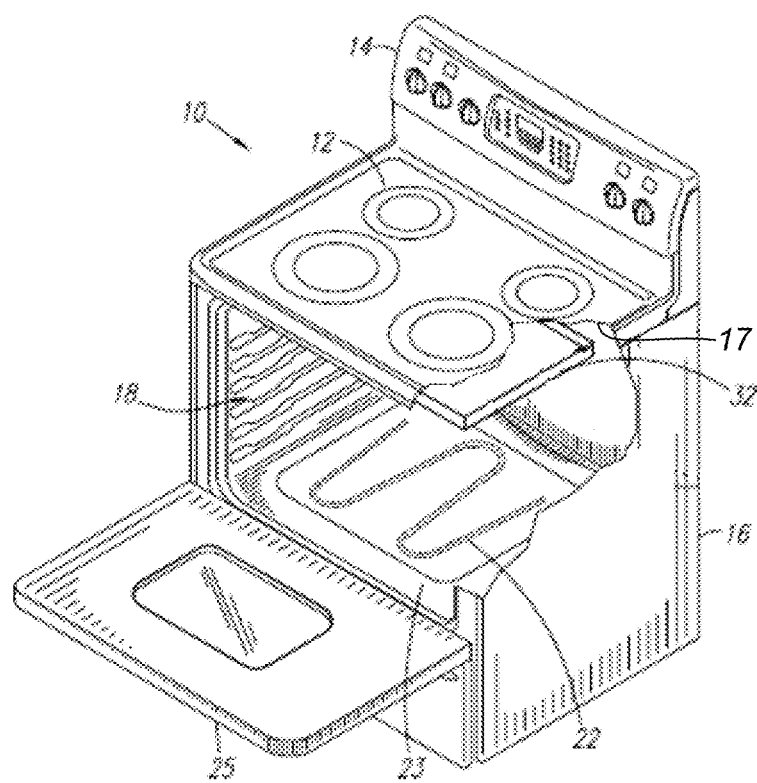
FIG. 1 is a perspective view of an illustrative embodiment of a cooking apparatus including a broil burner with a reflector.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

FIG. 1 shows an illustrative embodiment of a cooking apparatus 10. The embodiment of the cooking apparatus shown is an oven or range that includes a plurality of cooktop heating elements 12, in addition to an oven cavity 18 housing a broil burner 32 adjacent to a ceiling of the oven cavity 18 and a bake burner 22 adjacent to a floor 23 of the oven cavity 18. A pivotal door 25 is pivotally adjustable between a closed position and an open position to selectively grant access to an interior of the oven cavity 18. The cooking appliance 10 also includes one or more control elements that can be arranged on a control panel 14 to allow a user to control operation of the bake burner 22 and/or the broil burner 32, optionally independently of each other, to generate a desired amount of heat used for cooking the food item in the oven cavity 18. The control panel 14 can be a touch-pad or other touch-sensitive surface. Alternatively or additionally, the control panel 14 can include mechanical controls, such as buttons, knobs or other devices that can be user-operated or actuated. Any desirable orientation and configuration can be used for the control panel 14. For example, the control panel 14 can be placed on or near any desired surface of the cooking appliance 10. In the present example, however, the control panel 14 is positioned vertically at an upper back portion of the appliance cabinet 16.

The embodiment of the cooking apparatus 10 in FIG. 1 includes both an oven cavity 18 and the cooktop heating elements 12. However, alternate embodiments of the cooking apparatus 10 can include only an oven cavity 18, without the cooktop heating elements 12, and can be used in a variety of different configurations such as built-in gas ovens, etc. . . . For the sake of brevity, however, the embodiment of the cooking apparatus 10 shown in FIG. 1 will be used as an example to describe the broil burner 32 below.

Figure 2:
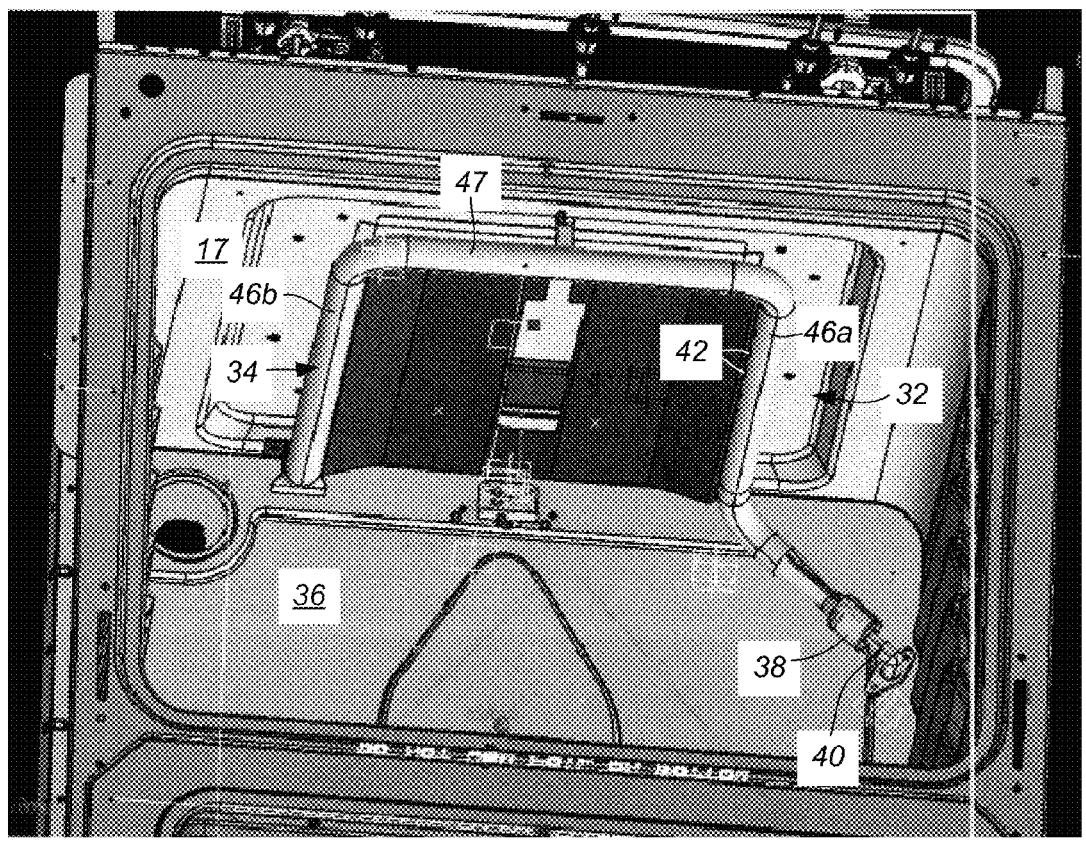
FIG. 2 is a front view into an illustrative embodiment of an oven cavity provided to a cooking apparatus, the oven cavity including a broil burner with a reflector suspended from a ceiling of the oven cavity.

The broil burner 32, which is partially shown in FIG. 1, is positioned in an upper region of the cooking cavity 18 adjacent to a ceiling 17 defining the top of the oven cavity 18 as illustrated in FIG. 2. As shown, the broil burner 32 includes a generally-tubular gas conduit 34 configured to extend between a rearward region of the oven cavity 18 adjacent to a back wall 36, and a forward region of the oven cavity 18 adjacent to the door 25. An inlet 38 is provided in fluid communication with the gas conduit 34 to cooperate with a gas source 40 and convey a combustible gas from the gas source 40 to the gas conduit 34. Shown more clearly in FIG. 4, a plurality of apertures 42 are formed in an inward-facing periphery of the gas conduit 34 through which the combustible gas exits the gas conduit 34 to be combusted. The gas conduit 34 can be formed of any heat-tolerant material, and with any desired dimensions. However, specific embodiments of the gas conduit 34 are formed from aluminized steel, with a substantially-cylindrical shape having an inner diameter of approximately one (1 in.) inch.

The gas conduit can have a generally U-shaped configuration in which opposing, laterally-spaced-apart segments 46a, 46b extend forward from the rearward region of the oven cavity 18 adjacent to the back wall 36. A joining region 47 extending transversely across the oven cavity 18 in the same plane as the laterally-spaced-apart segments 46a, 46b establishes fluid communication between the laterally spaced apart segments. Rounded elbows 49 or other suitable transitional connectors can be disposed between the joining region 47 and the laterally-spaced-apart segments 46a, 46b to gradually change the direction in which the combustible gas flows through the gas conduit 34. According to alternate embodiments, the gas conduit 34 can optionally be bent to form the desired shape.

Figure 3:
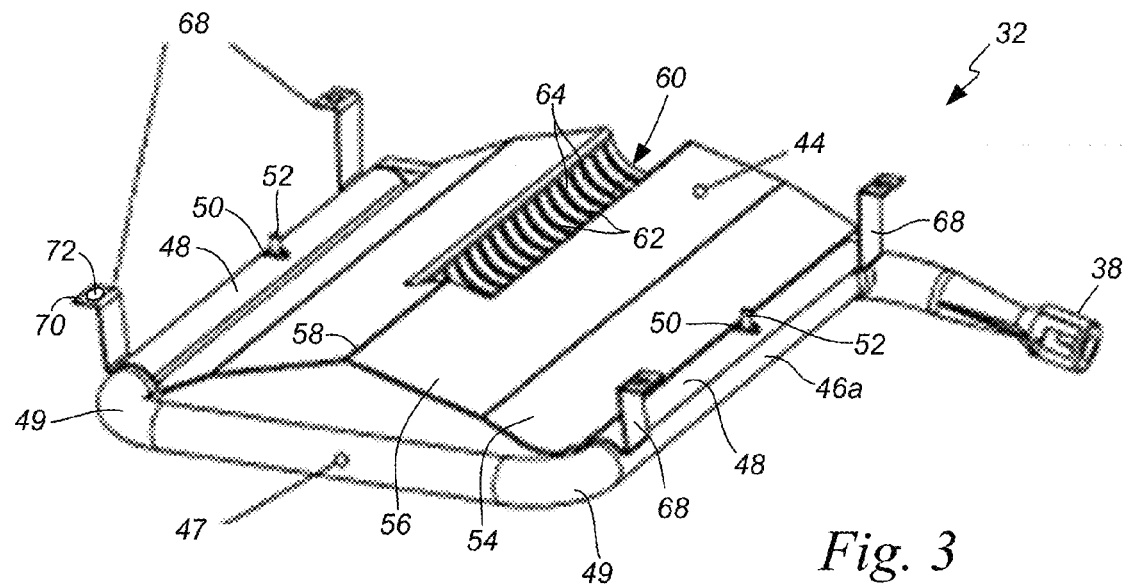
FIG. 3 is a perspective view of an illustrative embodiment of a broil burner including a reflector and a grille formed as part of the reflector.
Figure 4:
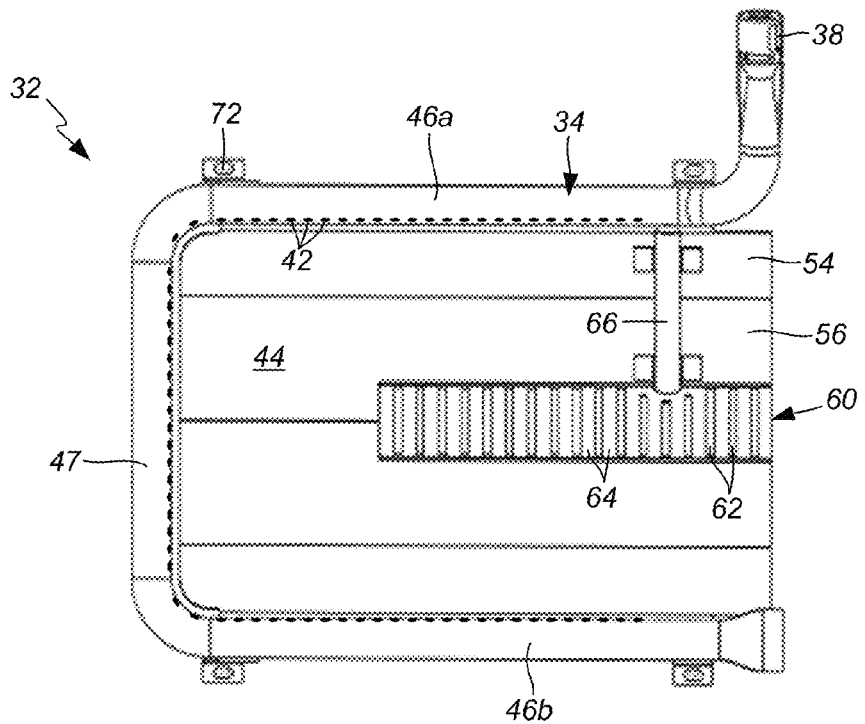
FIG. 4 is a bottom view of the broil burner shown in FIG. 3.

As shown in FIGS. 3 and 4, a reflector 44 extends between the laterally-spaced-apart segments 46a, 46b of the gas conduit 34 to reflect heat generated as a result of combustion of the combustible gas in a downward direction, generally toward a central region of the oven cavity 18. The reflector 44 can be formed of any heat tolerant, and heat reflecting material such as aluminized steel sheeting, for example. The reflector 44 can extend entirely between the laterally-spaced-apart segments 46a, 46b, spanning the entire distance there between. Each opposing side of the reflector 44 can include an arcuate brace 48 that can rest atop of the gas conduit 34. Each brace 48 can include an arcuate shape with a radius of curvature that is approximately the same as the radius of curvature of the external surface of the gas conduit 34. An aperture 50 formed in each brace 48 can be placed over a portion of a mechanical fastening system such as a bolt, threaded member, rivet, or other suitable fastener portion 52 extending upwardly from the laterally-spaced-apart segments 46a, 46b of the gas conduit 34. The fastener portion 52 can optionally be part of a releasable fastener that allows repeated removal of the reflector 44 from, and re-installation of the reflector 44 onto the broil burner 32. For such embodiments, a threaded nut or other fastener member compatible with the fastener portion 52 can be used to secure the reflector 44 in place on the gas conduit 34. The braces 48, and accordingly the portions of the reflector 44 adjacent to the laterally-spaced-apart segments 46a, 46b of the gas conduit 34, are arranged at an elevation vertically above the apertures 42 within the oven cavity 18 when the broil burner 32 is properly installed for use therein. With the reflector 44 installed in this position, a flame ring formed by combustion of the combustible gas exiting the apertures 42 is arranged closer to the central region of the oven cavity than the portions of the reflector adjacent to the gas conduit. In other words, the heat generated as a result of combustion of the combustible gas exiting the apertures 42 is reflected generally downward within the oven cavity 18, toward a central region of the oven cavity 18 where the food item being cooked is supported.

The reflector 44 can optionally include at least one, and optionally a plurality differently oriented angular regions. As shown in FIG. 3, a first region 54 of the reflector 44 is formed from an aluminized steel sheet arranged with a first upward angle relative to horizontal. The first region 54 is angled upward, toward a central region 58 (optionally an apex of the reflector 44) of the reflector 44, which can be symmetrical about the central region 58. A second region 56, separated from the brace 48 on that side by the first region 54, can optionally be oriented at another angle relative to horizontal, which is less than the angle of the first region 54. In other words, the reflector 44 can optionally begin to "flatten out" approaching the central region 58. However, the reflector 44 can include a single planar region with one angle separating the brace 48 on that side from the central region 58, can optionally include an arcuate region or region of any other desired shape, and/or a planar region that is substantially horizontal without departing from the scope of the present disclosure.

Along the central region 58, optionally equidistant from each of the laterally-spaced-apart segments 46a, 46b, the reflector 44 can include a grille 60. The grille 60 includes a plurality of arcuate members 62, which can be stamped from the reflector 44 material, or otherwise formed as part of a monolithic (i.e., formed as a single piece of material) reflector 44. As shown in FIG. 3, the arcuate members 62 curve downward, in a direction generally away from the surrounding portion of the reflector 44 toward a the central region of the oven cavity 18, forming a depression in the reflector 44. The arcuate members 62 are spaced apart, and separated from each other along an axis extending from back to front by apertures 64 through which heat generated by combustion of the combustible gas within the depression formed by the grille 60 is to be radiated downward, generally toward the central region of the oven cavity 18. According to the illustrated embodiments, the grill 60 extends partially forward, along the axis, but less than the entire extent of the reflector 44. For such embodiments, the grille 60 extends forward from a rearmost edge of the reflector 44 toward the joining portion 47 within a range from about 40% of the extent of the reflector 44, to about 75% of the extent of the reflector 44. However, according to alternate embodiments, the grille 60 can extend any desired distance along the extent of the reflector 44.

A flash tube 66 (FIG. 4) extends between the gas conduit 34 and the grille 60 to form an internal passage through which a portion of the combustible gas introduced to the gas conduit 34 through the inlet 38 is conveyed to the grille 60, where this portion of the combustible gas is to be combusted. For the embodiment shown in FIG. 4, the flash tube 66 extends along the underside of the reflector 44, so it is angled upward, extending from the gas conduit 34 to the grille 60, which is formed at a vertical elevation greater than the vertical elevation of the laterally-spaced-apart segments 46a, 46b of the gas conduit 34 within the oven cavity 18 while the broil burner 32 is properly installed for use. Although the flash tube 66 can have any desired inner dimensions, embodiments of the broil burner 32 include a flash tube 66 with an inner dimension that is less than an inner dimension of the gas conduit 34. For example, the inner diameter of the flash tube 66 can be smaller than the inner diameter of the gas conduit 34.

To install the broil burner 32, a plurality of mounting legs 68 extend upward from the gas conduit 34, reflector 44, or other portion of the broil burner 32 suitable for suspending the broil burner 32 adjacent to the ceiling 17 of the oven cavity 18. Each mounting leg 68 can optionally be formed from aluminized steel, and bent, stamped or otherwise formed to establish a desired spacing of the broil burner 32 from the ceiling 17. The mounting legs 68 can include a planar portion 70 to cooperate with the ceiling 17 and an aperture 72 formed in the planar portion 70 to receive a mechanical fastener that secures the planar portion 70, and accordingly, the broil burner 32, to the ceiling 17.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A broil burner comprising:
   a generally-tubular gas conduit configured to extend between a rearward region of an oven cavity and a forward region of the oven cavity, the gas conduit including two laterally spaced apart segments that define an open region between the two laterally spaced apart segments and an inlet that cooperates with a gas source to convey a combustible gas from the gas source to the gas conduit including the two laterally spaced apart segments, and a plurality of apertures through which the combustible gas exits the gas conduit to be combusted in the open region; and
   a reflector that extends over the two laterally spaced apart segments of the gas conduit and over the entire open region to reflect heat generated by combustion of the combustible gas in a downward direction, generally toward a central region of the oven cavity, the reflector extending an increasingly greater distance above the open region from each laterally spaced apart segment to a center of the open region.

2. The broil burner of claim 1 further comprising a mounting leg for suspending the broil burner adjacent to a ceiling of the oven cavity.

3. The broil burner of claim 1, wherein the inlet is arranged along the gas conduit to cooperate with the gas source adjacent to the rearward region of the oven cavity.

4. The broil burner of claim 1, wherein the gas conduit comprises a generally U-shaped configuration in which the two laterally spaced apart segments are joined together by a joining region that establishes fluid communication between the two laterally spaced apart segments.

5. The broil burner of claim 1, wherein the reflector and the gas conduit are coupled together by a releasable mechanical fastener.

6. A broil burner comprising:
   a generally-tubular gas conduit configured to extend between a rearward region of an oven cavity and a forward region of the oven cavity, the gas conduit comprising an inlet that cooperates with a gas source to convey a combustible gas from the gas source to the gas conduit and a plurality of apertures through which the combustible gas exits the gas conduit to be combusted; and
   a reflector that extends between opposing lateral segments of the gas conduit to reflect heat generated by combustion of the combustible gas in a downward direction, generally toward a central region of the oven cavity,
   a grille formed within a central region of the reflector between the opposing segments of the gas conduit; and
   a flash tube that extends between the gas conduit and the grille to convey a portion of the combustible gas introduced to the gas conduit through the inlet to the grille, where the portion of the combustible gas is to be combusted.

7. The broil burner of claim 6, wherein the grille comprises a plurality of arcuate members spaced apart from each other to form apertures through which heat generated by combustion of the combustible gas at the grille is to be radiated downward, generally toward the central region of the oven cavity.

8. The broil burner of claim 7, wherein the arcuate members comprise a substantially semi-cylindrical shape, extending downward from the reflector to extend generally toward the central region of the oven cavity when the broil burner is installed.

9. The broil burner of claim 6, wherein an interior dimension of the flash tube is less than an interior dimension of the gas conduit.

10. The broil burner of claim 1, wherein portions of the reflector adjacent to the two laterally spaced apart segments are arranged vertically above the apertures in the two laterally spaced apart segments so a flame ring formed by combustion of the combustible gas exiting the apertures in the two laterally spaced apart segments is arranged closer to the central region of the oven cavity than the portions of the reflector.

11. A cooking apparatus comprising:
   an oven cavity in which a food item is to be received and cooked;
   a bake burner arranged adjacent to a floor of the oven cavity, the bake burner being operable to generate heat for elevating a temperature within the oven cavity; and
   a broil burner that is arranged adjacent to a ceiling of the oven cavity and operable independently of the bake burner to generate heat for elevating the temperature in the oven cavity, the broil burner comprising:
      a generally-tubular gas conduit configured to extend between a rearward region of the oven cavity and a forward region of the oven cavity, the gas conduit including two laterally spaced apart segments that define an open region between the two laterally spaced apart segments and comprising an inlet that cooperates with a gas source to convey a combustible gas from the gas source to the gas conduit including the two laterally spaced apart segments, and a plurality of apertures in the two laterally spaced apart segments through which the combustible gas exits the gas conduit to be combusted in the open region, and a reflector that extends over the two laterally spaced apart segments of the gas conduit and over the entire open region to reflect heat generated by combustion of the combustible gas in a downward direction, generally toward a central region of the oven cavity, the reflector extending an increasingly greater distance above the open region from each laterally spaced apart segment to the center of the open region.

12. The cooking apparatus of claim 11 further comprising a mounting leg that cooperates with the ceiling of the oven cavity to suspend the broil burner adjacent to the ceiling.

13. The cooking apparatus of claim 11, wherein the inlet is arranged along the gas conduit to cooperate with the gas source adjacent to the rearward region of the oven cavity.

14. The cooking apparatus of claim 11, wherein the gas conduit comprises a generally U-shaped configuration in which the two laterally spaced apart segments that are to extend forward from the rearward region of the oven cavity and a joining region establishes fluid communication between the two laterally spaced apart segments.

15. The cooking apparatus of claim 11, wherein the reflector and the gas conduit are coupled together by a releasable mechanical fastener.

16. The cooking apparatus of claim 11 further comprising:
a grille formed within a central region of the reflector between the two laterally spaced apart segments of the gas conduit; and
a flash tube that extends between the gas conduit and the grille to convey a portion of the combustible gas introduced to the gas conduit through the inlet to the grille, where the portion of the combustible gas is to be combusted.

17. The cooking apparatus of claim 16, wherein the grille comprises a plurality of arcuate members spaced apart from each other to form apertures through which heat generated by combustion of the combustible gas at the grille is to be radiated downward, generally toward the central region of the oven cavity.

18. The cooking apparatus of claim 17, wherein the arcuate members comprise a substantially semi-cylindrical shape, extending downward from the reflector to extend generally toward the central region of the oven cavity when the broil burner is installed.

19. The cooking apparatus of claim 16, wherein an interior dimension of the flash tube is less than an interior dimension of the gas conduit.

20. The cooking apparatus of claim 11, wherein the portions of the reflector adjacent to the gas conduit are arranged vertically above the apertures in the two laterally spaced apart segments so a flame ring formed by combustion of the combustible gas exiting the apertures in the two laterally spaced apart segments is arranged closer to the central region of the oven cavity than the portions of the reflector adjacent to the gas conduit.

21. The broil burner of claim 1, wherein the reflector and the gas conduit are coupled together by a releasable mechanical fastener, the gas conduit comprising a generally U-shaped configuration in which the two laterally spaced apart segments are joined together by a joining region that establishes fluid communication between the two laterally spaced apart segments.

* * * * *